(No Model.)
W. H. MILLER.
COOKING STOVE.
No. 354,922. Patented Dec. 28, 1886.
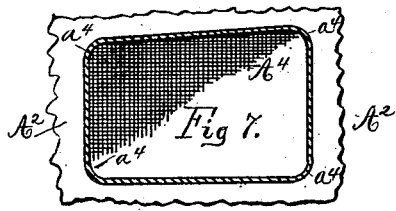
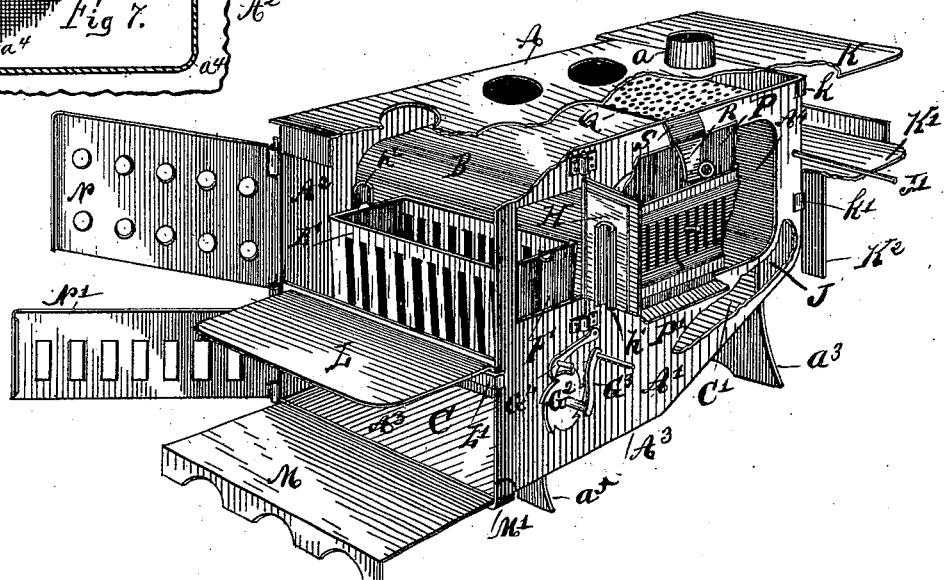
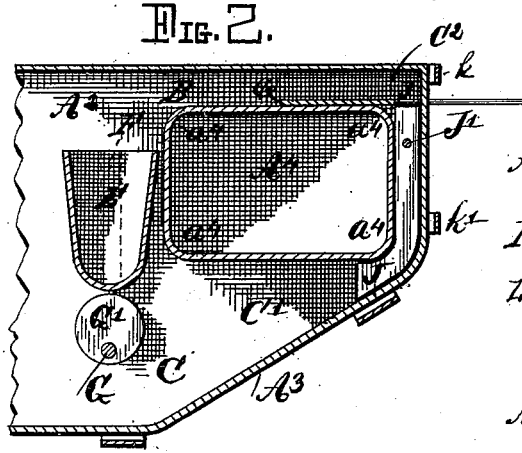
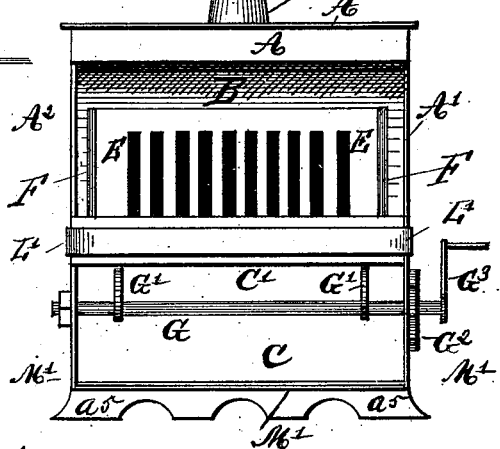
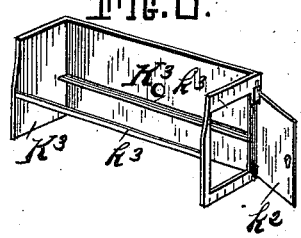
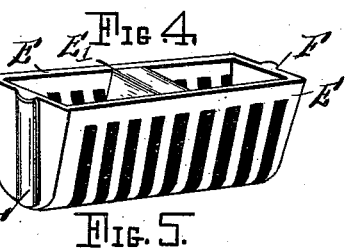
WITNESSES.
Thos. E. Morgan
Frank G. Bovee
INVENTOR.
William H. Miller
by John Curry Miller
ATTORNEY.

United States Patent Office.

WILLIAM H. MILLER, OF BRANDENBURG, KENTUCKY.

COOKING-STOVE.

SPECIFICATION forming part of Letters Patent No. 354,922, dated December 28, 1886.

Application filed April 27, 1885. Serial No. 163,540. (No model.)

*To all whom it may concern:*

Be it known that I, WILLIAM H. MILLER, a citizen of the United States, residing at Brandenburg, in the county of Meade and State of Kentucky, have invented certain new and useful Improvements in Cooking-Stoves; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this improvement is to obtain a cooking-stove of greater economy, efficiency, and general convenience, by providing the same with a grate or fire-basket that may be quickly adjusted perpendicularly by any person of ordinary intelligence, and thus made to apply the heat of the fire over the top of the oven on the matter contained in the cooking-vessels, or moved to and secured in a position which will give the principal heat direction underneath the oven for a special purpose, or adjusted to an intermediate position that will cause the heat to act both over and under and around the oven, and thus act with efficiency on the matter contained in the oven as well as the cooking-vessels on the top of the stove, and to otherwise provide the stove with such construction as will insure such action of the heat, and also facilitate keeping the stove in order by easy cleaning, and also to secure additional features of convenience necessary to but not possessed by the cooking-stoves heretofore in use. These results are attained by the mechanism illustrated in the drawings herewith filed as part hereof, in which the same letters of reference denote the same parts in the different views.

Figure 1 is a perspective view with parts broken away, representing a cooking-stove embodying the features of my improvement. Fig. 2 is a longitudinal vertical section of the same. Fig. 3 is a front view with parts removed. Fig. 4 is a representation of one of the parts detached. Fig. 5 is a detail. Fig. 6 is a perspective view of one of the details. Fig. 7 is a longitudinal vertical section.

A $A'$ $A^2$ $A^3$ is the body of the stove, which has an ordinary upper draft-course, B, and a lower draft-course which is enlarged at the front C, and is provided with an upward inclination or reduction, $C'$, toward the rear, where it has a curved and vertical continuation, $C^2$, in the rear of the oven $A^4$, and thus connects the lower draft-course with the uptake opening $a$. The stove is supported by legs $a^3$ $a^5$, which extend across the bottom thereof, and are detachably secured thereto by flanged extensions, which are inserted into recesses formed by lugs cast integral with the stove's bottom, or by plates riveted thereto, as indicated more fully in Fig. 2.

E is the grate or fire-basket, provided centrally at each end with beads or projections F, which correspond in position with a grooved projection, $h'$, on the side plate $A^2$, and grooved projection $h$ on the furnace-door H, which is hinged to the side plate $A'$ in the ordinary manner. The grooved projections $h'$ $h$ fit snugly over the grate projections F, and hold the latter in true vertical position.

G is a shaft having bearings in the side plates, $A'$ $A^2$, immediately under the fire-basket E, where it is provided with eccentric disks $G'$ $G'$, pinned or otherwise suitably secured to the shaft, for the purpose of operating the fire-basket, as hereinafter more fully set forth.

$G^2$ is a ratchet-disk secured to the shaft G, outside of the plate $A'$, to which is secured a pawl, $G^4$, in position, as shown, to engage with the detents of the ratchet $G^2$, when the shaft G is operated by means of the crank $G^3$, which will, according to the direction in which it is turned, cause the eccentrics $G'$ $G'$ to engage with or move away from the fire-basket, and thus raise the latter, or allow it to descend, and be held in any desired relative position by the pawl $G^4$.

J is a scraper snugly fitted to the curved and vertical continuation $C'$ $C^2$ of the draft-course C.

$J'$ is a rod connected to the scraper J through the stove-plate $A'$, for the purpose of operating the same across the rear draft-course and keeping the latter free from soot.

K is a detachable plate, provided with a flange which fits a recess between the body of the stove and a plate, $k$, suitably secured to the upper rear part of the stove-body. Below the plate $k$ is a similarly-connected plate, $k'$, which furnishes the means for detachably affixing a flanged plate, $K'$, which, in connection with a metal frame composed of plates $K^3$ $K^3$, door $k^2$, and bearing-bars $k^3$, as shown in Fig. 6, forms a warming-oven for the stove.

$K^2$ is a leg or support for the plate $K'$ and connecting parts forming the warming-oven.

L is a detachable hearth-plate, provided with a flange at the inner side which fits within a recess between the stove-body and a plate, $L'$, suitably secured thereto, for receiving the flange of the plate L.

S is a plate affixed to the stove-plate $A'$, for the reception of an oscillating latch, R, secured to the oven-door P, hinged to the stove-plate $A'$ in the ordinary manner, and provided at its lower part with a retangular projection, $P'$, which will engage with the side of the stove and hold the oven-door in a horizontal position, as occasion may require. Each side of the stove is provided with a similar mechanism.

Hinged to the stove in the ordinary way is a perforated damper-door, N, for the furnace, provided with a similarly-perforated sliding plate for the purpose of partially or entirely closing the perforations in the door N, and thereby regulating the draft over the upper draft-course, B.

Hinged to the stove in the ordinary manner is a slotted damper-door, $N'$, provided with a similarly-slotted sliding plate, for the purpose of partially or entirely closing the slots in the door $M'$, and thereby regulating the draft and the action of the heat either over, under, or around the oven $A^4$.

Q is a perforated damper, arranged to slide backward or forward on the oven-top by means of a rod extending through the warming-oven to reduce without curtailing entirely and more or less regulate the action of the heat through the inclined and vertical draft-courses C $C'$ $C^2$.

$E'$ is a bent plate, provided at its lower ends with forks or prongs to fit over the bars of the fire-basket E, as more fully shown at $g$ in Fig. 5, for securing the position of the plate $E'$ in any desired position, substantially as represented in Fig. 4, in order to economize fuel by avoiding the necessity of making a fire the entire length of the grate when, as is often the case, the fire can only be applied to a single cooking-vessel located on the side of the draft-course B.

M is a detachable hearth-plate, secured to the stove by inserting its inner edge into a correspondingly-sized recess formed for the purpose between the stove-bottom $A^3$ and a plate, $M'$, affixed thereto by any suitable means.

By moving the grate E to its highest position the action of the fire will be directed principally on the cooking-vessels on the top thereof. By allowing it to descend to and remain in its lowest position and closing the upper damper-door, N, the action of the heat will be directed principally underneath the oven and through the vertical draft-course $C^2$, and by adjusting the grate to any intermediate position the heat will be simultaneously directed over the top, underneath, and thence around the rear of the oven, which, by reason of the heat from the grate in the front thereof, will be entirely surrounded by heat, and as this action of the heat can be variously modified or intensified by suitable adjustment of the damper-doors N $N'$ and sliding damper Q, it is obvious that the stove will give results as regards baking and roasting not attainable by cooking stoves heretofore or at present in use. By reason of the hearth-plates and warming-oven being detachable, the shipment of the stove from place of manufacture to distant points can be done in less space and at less expense, and for the same reason the stove can be more conveniently and safely changed from one location to another on occasions of changing the family residence.

Having explained the construction and operation of my improvement, what I claim as new, and desire to secure by Letters Patent, is—

In a cooking stove having a vertically-adjustable grate, the shaft supported by the stove-walls and provided with eccentrics adjacent to the opposite ends of the grate, as shown, and a ratchet arranged to engage with a pawl affixed to the stove-wall, in combination with the stove and grate, substantially as specified, for the purpose set forth.

In testimony whereof I affix my signature in presence of two witnesses.

WILLIAM H. MILLER.

Witnesses:
H. T. KENDALL,
W. H. GOUGH.